Nov. 22, 1932.  E. B. G. LEFEVRE  1,888,729
DEVICE FOR UPHOLSTERING VEHICLE DOORS
Original Filed Nov. 19, 1930

INVENTOR.
E. B. G. Lefevre
BY
ATTORNEY.

Witness.
E. C. McRae.

Patented Nov. 22, 1932

1,888,729

UNITED STATES PATENT OFFICE

EMIL B. G. LEFEVRE, OF DETROIT, MICHIGAN, ASSIGNOR TO FORD MOTOR COMPANY, OF DEARBORN, MICHIGAN, A CORPORATION OF DELAWARE

DEVICE FOR UPHOLSTERING VEHICLE DOORS

Original application filed November 19, 1930, Serial No. 496,767. Divided and this application filed April 8, 1932. Serial No. 604,049.

The object of my invention is to provide a device whereby upholstery panels and various mouldings may be quickly secured to the inside of automobile doors and bodies so as to be readily detachable, which device will be cheap to manufacture, indestructible in use, and easy to assemble in place. The interior of automobile doors are required to have upholstery thereon which may be readily removed so that the window regulator and lock mechanism of the door may be made accessible in case of repair or replacement. Thus, the upholstery which covers this portion of the door must be conveniently removable in order to service these parts.

Further, it is very desirable to secure the upholstery to the door so that the fastening means are invisible. With this in mind, I have provided an upholstery fabric which is fastened over a cardboard panel, the panel having a plurality of openings for receiving my improved fasteners, which fasteners extend inwardly through the panel into suitable openings in the door frame.

Further, header strips, mouldings and other trim strips can be detachably secured in place with this device in a much quicker and less expensive manner than by means of screws or other conventional fastening means.

Still a further object of my invention is to provide an upholstery panel which may be conveniently transported in a dismantled condition to various assembly plants throughout the country and there quickly and with a minimum amount of labor made ready for assembly to the car.

Heretofore, such upholstery panels have been provided with various types of clips therein, the upholstery being glued secured around the edges of the panel so that the clips extend from the inside face thereof. When it was necessary to ship these panels, great inconvenience was encountered because of the relatively fragile clips which projected from one side of the panel. It was therefore impossible to stack these panels in piles for economical shipment. Further, if the clips were left out of the panels when being shipped it was also necessary to omit the upholstery and padding from being assembled to the panels so that an excessive amount of work had to be done in the branch assembly plants to make these panels suitable for installing on the door. With my improved clip construction I prefer to stitch the upholstery and padding to the cardboard panel, running the seam around the panel spaced from its edges. The openings which are later to receive my fastening clips are provided in the panel between this seam and the edges of the panel. In this way I am able to stack the cardboard panels with the upholstery and padding thereon in convenient bundles or piles for economical shipment. When the panels have been received in the assembly plants, the fastening clips are inserted in the prepared openings and edges of the upholstery glued around the back of the panel thus making the panel ready for installation with very little labor.

With these and other objects in view my invention consists in the arrangement, construction and combination of the various parts of my improved device, as described in the specification, claimed in my claims and illustrated in the accompanying drawing, in which:

Figure 5:
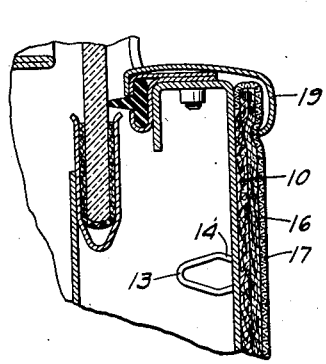
Figure 5 shows a vertical sectional view of a portion of my upholstery panel, illustrating the method by which the vehicle garnish strip secures the upper edge of the strip in place.

Referring to the accompanying drawing, I have used the reference numeral 10 to indicate generally a cardboard panel of rectangular shape of a size sufficient to cover the portion of the door being upholstered. Around the edges of the panel 10 are provided a plurality of openings 11 aligned with similar openings 12 in the door sills and pillars so that my improved clips which are inserted in the openings 11 may project into the openings 12 to resiliently secure the parts together.

These clips consist of a flat spring steel V-shaped member, illustrated at 13. The outer ends of the V are bent inwardly, as at 14, and the outer ends of these portions 14 are bent back upon themselves to form a pair of outwardly extending arms 15. Due to the great resiliency of the flat spring steel strip from which the clips are made, the portions 14 and 15 may be readily sprung toward each other to thereby insert the clip in the openings 11 and 12 which are so proportioned that the clip will be squeezed together when inserted therein. Likewise, when once the clips are inserted into the openings they will be resiliently held in place by the tension of the material therein.

Figure 3:
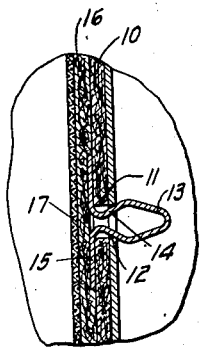
Figure 3 shows a sectional view through an upholstery panel having my improved fastener clips installed thereon.

Referring to Figure 3, my improved upholstery clip is inserted in one of the openings 12 so that the ends 15 are on the exposed side of the cardboard. A sheet of padding 16, or what is generally termed blue wadding, is placed over this side of the panel and then a section of upholstery fabric 17 is placed over this wadding. The wadding and fabric are stitched together and to the panel 10 by a seam 18 which extends around the periphery of the panel, the openings 11 being provided between the edges of the panel and this seam. The purpose of providing the openings 11 between the seam 18 and the outer edges of the panel is so that after the upholstery is thus fastened in place the fastener clips may be inserted in these openings.

When it is desired to assemble the vehicles in a branch assembly plant the clips are shipped separately and the panels, blue wadding and upholstery, having been previously stitched together, are conveniently stacked in piles. After the panels have thus been shipped and received at the assembly plant the clips are inserted in the openings 11 and then that portion of the upholstery between the stitching 18 and the outer edges thereof is glued around the back of the panel making the device ready for assembly to the door.

To assemble my upholstery panel to the door the completed panel is placed with the clips 13 adjacent to the openings 12 in the door. The panel is then given a light blow directly over each of the clips which springs them in the adjacent opening to thereby resiliently hold the panel in place. Due to there being quite a number of clips used, the panel is firmly held in position on the door. It may be desirable to extend the window garnish strip which I have given the numeral 19 over the top edge of the panel, as illustrated in Figure 5 to prevent the accidental removal of the panel.

When for any reason it is desired to remove the panel from the door a screw driver, knife blade, or some similar article is inserted between the panel and the door and the panel then pried loose. After the purpose for removing the panel is satisfied the panel can again be reassembled as just described.

Figure 6:
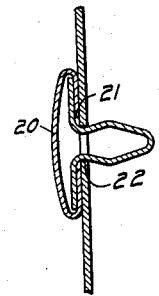
Figure 6 shows a cross sectional view of a moulding secured in place by my improved fastener.
Figure 1:
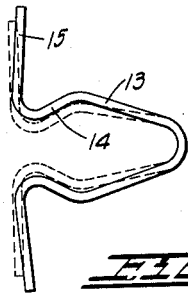
Figure 1 shows a plan view of one of my improved fastening clips.
Figure 2:
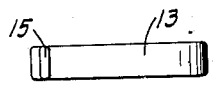
Figure 2 shows a side view of the clip, shown in Figure 1.
Figure 4:
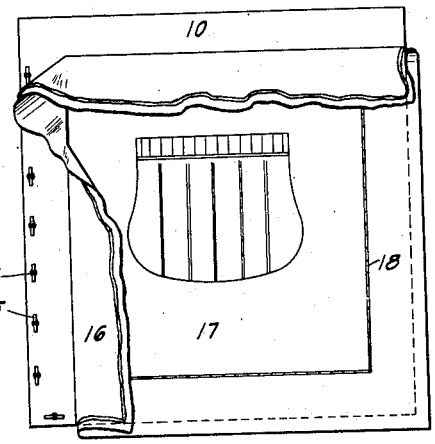
Figure 4 shows a panel illustrating the method by which I preferably fasten the upholstery thereto so as to allow the same to be shipped independently of the upholstery clips.

Referring to Figure 6, it may be desirable to secure a moulding 20 to the vehicle by means of my fastening device, in which case the moulding is formed having a cross section of flattened tubular shape with a longitudinal slot 21 extending along the inner side of the moulding. The fastener arms 15 are inserted through this slot and then the clip rotated a quarter turn so that the arms extend transversely across the hollow center, the V-shaped portion of the clip extending inwardly from the inner face of the moulding. A plurality of clips are so inserted in the moulding and then the latter is pressed down over suitable openings 22 in the body into which the clips extend to thereby detachably secure the moulding in place.

Among the many advantages arising from the use of my improved device it may be well to mention that my improved clip is simple and relatively inexpensive to manufacture and forms a very convenient method of securing the panel to the door pillar. Further, by so stitching the upholstery to the panel I am able to transport these assemblies to the branch plants in relatively large bundles which is an important commercial advantage in the upholstery cost of the vehicle.

Some changes may be made in the arrangement, construction and combination of the various parts of my improved device without departing from the spirit of my invention, and it is my intention to cover by my claims, such changes as may reasonably be included within the scope thereof.

This application is a division of my copending application, Serial No. 496,767, filed November 19, 1930.

I claim as my invention:

1. An upholstery panel consisting of, a cardboard reinforcing panel having a section of upholstery fabric overlapping its edges, said fabric being secured thereto by a stitched seam spaced from the edges of said panel, and said panel having a plurality of fastener clip receiving openings disposed therein between its periphery and said seam to thereby allow the insertion of the clips after the assembly of the fabric on the panel.

2. An upholstery panel consisting of, a cardboard reinforcing panel having a layer of wadding interposed between itself and a section of upholstery fabric, the edges of which fabric overlap the edges of said panel, and a seam stitched through said fabric and padding and panel at points spaced from the periphery of the panel, said panel having a plurality of fastener clip receiving openings disposed therein between its periphery and said seam to thereby allow the insertion of the clips after the assembly of the padding and fabric to the panel.

EMIL B. G. LEFEVRE.